United States Patent [19]

Cailler et al.

[11] Patent Number: 5,242,705
[45] Date of Patent: Sep. 7, 1993

[54] PROCESS FOR THE PREPARATION OF A SWEETENER BASED ON ASPARTAME, WHICH IS IN A DRY FORM SIMILAR TO THAT OF A LUMP OF SUGAR

[75] Inventors: Christiane Cailler, Antibes; Albert T. T. Luong, Paris; Isabelle Maroteaux, Antibes, all of France

[73] Assignee: G. D. Searle & Co., Chicago, Ill.

[21] Appl. No.: 911,836

[22] Filed: Jul. 10, 1992

Related U.S. Application Data

[63] Continuation of Ser. No. 559,755, Jul. 30, 1990, abandoned.

[30] Foreign Application Priority Data

Jul. 31, 1989 [FR] France .............................. 89 10315
Jul. 25, 1990 [EP] European Pat. Off. ....... 90 402133.4

[51] Int. Cl.$^5$ .............................................. A23L 1/236
[52] U.S. Cl. ..................................... 426/548; 426/385
[58] Field of Search ............................ 426/548, 385

[56] References Cited

U.S. PATENT DOCUMENTS 2,751,687  6/1956  Colton ................................ 426/385
4,007,288  2/1977  Glicksman et al. ................. 426/548
4,980,189  12/1990  Keme et al. ......................... 462/548

FOREIGN PATENT DOCUMENTS

35206/89  11/1989  Australia .
0094088  11/1983  European Pat. Off. .
0106910  5/1984  European Pat. Off. .
86/06747  11/1986  PCT Int'l Appl. .
88/08674  11/1988  PCT Int'l Appl. .

*Primary Examiner*—Joseph Golian
*Attorney, Agent, or Firm*—Roger A. Williams; Paul D. Matukaitis

[57] ABSTRACT

The present invention relates to a process for the preparation of a sweetener based on aspartame, which is in a dry form similar to that of a lump of sugar.

According to the invention, this process comprises the preparation of a composition consisting in an aqueous dispersion of aspartame and at least one agent for modifying the texture, selected from polysaccharide with a high gelling power and monosaccharides or disaccharides with low calorific power, and the lyophilization of the resulting dispersion.

Application: food industry; sugar substitute.

17 Claims, No Drawings

PROCESS FOR THE PREPARATION OF A SWEETENER BASED ON ASPARTAME, WHICH IS IN A DRY FORM SIMILAR TO THAT OF A LUMP OF SUGAR

This is a continuation of application Ser. No. 07/559,755, filed Jul. 30, 1990, now abandoned.

The present invention relates to a process for the preparation of a sweetener based on aspartame for use in foodstuffs, and presented in dry form such as that of a lump of sugar.

The invention usually finds application in the food industry, in particular in the preparation of sugar substitutes.

A sweet taste, which represents a need and a pleasure both essential to man, is obtained from natural substances, the best known and most widely used today being sucrose, which is essentially an extract of sugar cane or sugar beet.

The enjoyable taste obtained with sucrose is due not only to its sweet flavor but also to the sensation of "fullness" felt in the mouth. This "fullness", or "body" is felt in a particularly distinct manner when drinking tea or coffee sweetened with sugar.

However, sucrose, because of its high nutritive value may cause certain disorders such as for example atherosclerosis or the condition of being overweight. This is the case, in particular, when excessive amounts are consumed or in the case of certain diseases such as diabetes. Furthermore, sucrose has a relatively high cariogenic effect.

That is why for many years much research has been carried out in order to find substitutes capable of generating the same sensations and the same flavor as that of sucrose, but with none of the aforesaid disadvantages.

Examples of the known substitutes are saccharin, cyclamate, acesulfame as well as certain compounds derived from higher alcohols However, none of these substances is really suitable for the intended purpose, either because they do not provide the agreeable taste of sucrose, or because their consumption can cause undesirable side effects.

The discovery of aspartame (3-amino-N-α-carboxyphenethyl)succinamic acid N-methyl ester) reveals a definite progress in relation to the previously known substances. In particular, the sweet flavor of aspartame does not leave any after-taste as do some sweeteners such as saccharin. Furthermore, aspartame in solution provides a very strong sweet flavor. Thus, it is estimated that 20 mg of aspartame provides a sweetness equivalent to that of a 5 g lump of sugar. The calorific value of this amount of aspartame is practically zero, which eliminates any associated risk of hyperglycemia or of excess of weight resulting from a carbohydrate intake.

However, in every case, a solution of aspartame only provides one of the components of the sensation provided by sucrose. In effect, aspartame does not provide the sensation of fullness or body characteristic of a sucrose solution (for example in a syrup).

It is therefore the aim of the present invention to solve the new technical problem consisting in providing a new process for the preparation of a sweetening agent intended for foodstuffs, which is in a dry form similar to that of a sugar lump which, when consumed, provides the same sensation as that generated by sucrose. The solution, according to the present invention, for solving this technical problem consists in a process for preparing a sweetener based on aspartame, destined for the food industry which is in dry form similar to that of a lump of sugar, characterized in that it comprises the preparation of a composition consisting in an aqueous dispersion of aspartame and at least one agent modifying the texture selected from monosaccharides and polysaccharides with a high gelling power and monosaccharides or disaccharides with a low calorific value; and the lyophilization of the resulting dispersion.

The present invention results from the rather surprising and unexpected discovery that an agent selected from monosaccharides add polysaccharides with high gelling power and monosaccharides or disaccharides with low calorific power permits a modification of the texture of an aqueous dispersion of aspartame, leading to a composition capable of being converted into a sweetener which is in a dry form similar to that of a lump of sugar and which, after redissolution in water or a liquid containing water, provides the same sensation as that provided by redissolution of a lump of sugar.

This discovery is all the more surprising as a number of compounds capable of modifying the texture of a composition of aspartame, such as for example derivatives of cellulose, maltodextrins, desaturated gelatins, alone or in combination do not give the desired effects, namely a sweet taste as close as possible to that of sucrose and the "substantiality" of this flavor, while retaining the properties of aspartame and, in particular, its very low calorific supply. Thus, gelatin-based preparations have either too much body or are too fluid, with a marked taste of peptone which does not correspond to that of a syrup. Many tests have also been carried out using polyvinylpyrrolidone solutions as well as solutions of various derivatives of cellulose such as the hydroxypropylmethylcelluloses, but the results have proved to be disappointing.

According to a first embodiment of the process of the invention, said lyophilization step is carried out in vats equipped with partitions dividing it into cavities having substantially the dimensions of a lump of sugar.

According to a second embodiment of the invention, said lyophilization step is followed by the conversion of the lyophilized product into lumps, similar to sugar lumps, by a mechanical method such as by using a guillotine.

By lyophilization is meant any drying process involving freezing of the substance to be lyophilized followed by a vacuum sublimation of the frozen water.

According to a particular feature of the process of the invention, said composition is prepared by dispersing aspartame in water, preferably cold water, by using a mixer with a high shearing power, and by incorporating to the resulting mixture, under slight stirring, the agent or agents modifying the texture.

According to another particular feature, the composition consisting in said dispersion comprises, as expressed by weight, about 0.1 to 2% and preferably 1% of aspartame, about 10 to 45%, and preferably 20 to 35% by weight of agent or agents modifying the texture, and water to bring the total to 100%, with the minimal water content being at least about 45%. A water content of about 55% to about 75% is preferred with 60 to 70% being most preferred.

Optionally, this composition comprises also a polyalcohol in a proportion by weight ranging between 10 and 40%, and preferably 10 to 20%. The preferred polyalcohol is mannitol.

A presently preferred composition for carrying out the process according to the invention, comprises, by weight:

about 0.1 to about 2%, and preferably 1%, of aspartame;

about 1 to about 5% of a compound selected the monosaccharides and disaccharides of low calorific value;

about 9 to about 40% of at least one compound selected from monosaccharides and polysaccharides with high gelling power; and optionally about 10 to about 40% of polyalcohols; and about 55 to about 75% of water.

For carrying out the process according to the invention, an agent for modifying the texture is advantageously selected from:

(a) Monosaccharides and disaccharides of low calorific value which include hydrogenated isomaltulose, maltitol and xylitol with hydrogenated isomaltulose being preferred. Hydrogenated isomaltulose, also known as isomalt, is a sugar substitute which can be used in place of sucrose, glucose, or similar sugars for the production of food stuffs. Hydrogenated isomaltulose may be classified as a carbohydrate and more specifically, a hydrogenated disaccharide. Hydrogenated isomaltulose is available from Palatinit GmbH under the trademark name PALATINIT ®. According to the manufacturer, the production of hydrogenated isomaltulose involves an enzymatic rearrangement of saccharose into a much more stable compound known as isomaltulose (trademark name palatinose). Following a purifying crystallization, the isomaltulose is hydrogenated to form the resulting palatinit compound. Specifically, palatinit is an equimolecular mixture of the isomers alpha -D-glucopyranosido-1,6-mannitol (GPM) and alpha -D-glucopyranosido-,16-glucitol (GPG). Palatinit is described as an odorless, white, crystalline, nonhygroscopic substance containing about 5 percent water of crystallization. (b) Monosaccharides and polysaccharides with high gelling power which include maltodextrin sorbitol (i.e., hydrogenated dextrose) and modified starch. A preferred modified starch is sold under the trademark CLEARGUM CB 90 ® by the French company Roquette. CLEARGUM CB 90 is a waxy type cornstarch with the property of being fluid at high temperatures. It is a well known product which is widely used by food companies. Also dextrose (D-glucose) such as that available from the French company Cerestar under the trademark CERELOSE ® can be used. The dextrose is made by the total hydrolyis of starch.

The presently preferred composition for carrying out the process according to the invention comprises, by weight:

about 1% aspartame about 5% dextrose or hydrogenated dextrose about 30% isomaltulose as hydrogenated disaccharide (hydrogenated isomaltulose), and about 64% water.

Other aims, characteristics and advantages of the invention will also become apparent in the light of the explanatory description which follows, which makes reference to examples of the embodiment of the invention given simply as illustrations and which hence in no way limit the scope of the invention.

Unless otherwise indicated, the percentages given in the examples are percentages by weight.

EXAMPLE 1

Step 1

Preparation of a composition containing:

| | |
|---|---|
| - hydrogenated dextrose | 5% |
| - hydrogenated isomaltulose | 30% |
| - aspartame | 1% |
| - water | 64% |

The following procedure was used:

The aspartame is first dispersed in cold water by means of a mixer of high shearing power of Ystral type such as that supplied by Janke & Kunkel under the trademark ULTRA-TURAX IKAT50.

Hydrogenated isomaltulose and hydrogenated dextrose are then successively incorporated into the resulting mixture under moderate stirring.

Step 2

Preparation of a sweetener, intended for foodstuffs, which is in dry form similar to that of a lump of sugar;

The mixture obtained in step I is distributed in a mold or vat equipped with partitions defining cavities having approximately the dimensions of a lump of sugar and then cooled.

The molds thus prepared are then placed in a lyophilizer. The products are rapidly frozen to about $-35°$ C. to about $-50°$ C., and sublimated in a vacuum of about $-10^{-1}$ torr.

A secondary lyophilization is carried out for several hours until a vacuum of less than $8 \times 10^{-2}$ torr is obtained. This secondary lyophilization may be helped by heating such that the temperature of the molds is raise to about 50° C. to 60° C.

The molds are then taken out of the lyophilizer and perfectly dry products are obtained, of smooth appearance and having the form of a conventional lump of sugar.

These lumps of product have a resistance to handling which is sufficient for industrial packaging, and they can be dissolved almost instantaneously in hot or cold liquid products, such as water, tea and coffee, and give a sweet taste quite similar to that obtained with a conventional lump of sugar.

EXAMPLES 2 to 5

By following the procedure described in example 1, sweeteners intended for foodstuffs have been prepared which are available in a dry form similar to that of a lump of sugar, from the following compositions:

EXAMPLE 2

| | |
|---|---|
| - modified starch | 5% |
| - hydrogenated isomaltulose | 30% |
| - aspartame | 0.23% |
| - water | 64.67% |

EXAMPLE 3

| | |
|---|---|
| - modified starch | 1% |
| - hydrogenated dextrose | 2% |
| - hydrogenated isomaltulose | 30% |
| - aspartame | 1% |

-continued

| - water | 66% |
|---|---|

EXAMPLE 4

| - modified starch | 5% |
|---|---|
| - mannitol | 15% |
| - hydrogenated isomaltulose | 15% |
| - aspartame | 0.3% |
| - water | 64.7% |

EXAMPLE 5

| - mannitol | 15% |
|---|---|
| - hydrogenated isomaltulose | 15% |
| - modified starch | 5% |
| - aspartame | 1% |
| - water | 64% |

The products of examples 1 to 5 were tested by a tasting panel. Drinks sweetened by mean of the products corresponding to the invention were judged to be practically equivalent in taste and flavor to a drink sweetened by means of sucrose.

It follows from the foregoing that the present invention makes it possible, for the first time, to prepare a product which has the appearance of conventional sugar and which provides the same gustatory sensations as sugar but the calorific value of which is much less than that of sugar (5 to 20 times lower).

Furthermore, these products can be dissolved rapidly to lead to a clear or slightly opalescent solution depending on the volume of reconstitution and these solutions have no after-taste.

We claim:

1. A process for preparing a low calorie sweetener which is in solid form, said process comprising:
   (a) preparing a mixture comprising by weight:
      about 0.1 to about 2.0% of aspartame:
      about 1 to about 5% of a texture modifying agent of low calorific value selected from the group consisting of hydrogenated isomaltulose, maltitol, and xylitol;
      about 9 to about 40% of at least one texture modifying agent having high gelling power selected from the group consisting of maltodextrin, hydrogenated dextrose, and modified starch; and
      optionally, about 10 to about 40% of mannitol; and
      about 60% to about 70% of water
   by:
      first dispersing the aspartame in the water with a mixing means which applies a shearing force sufficient to produce a dispersion of the aspartame in the water; and then
      (2) successively mixing into the dispersion of aspartame in water, the texture modifying agent of low calorific value, the texture modifying agent having high gelling power, and, optionally, the mannitol; and
   (b) lyophilizing the resulting mixture into a stable solid form; and
   optionally converting the lyophilized product into shaped lumps using a cutting means.

2. A process according to claim 1 for preparing a low calorie sweetener which is in solid form, said process comprising:
   (a) preparing a mixture comprising by weight:
      1% aspartame;
      30% hydrogenated isomaltulose;
      5% hydrogenated dextrose; and
      64% water
   by:
      (1) first dispersing the aspartame in the water with a mixing means which applies a shearing force sufficient to produce a dispersion of the aspartame in the water; and then
      (2) successively mixing into the dispersion of aspartame in water, the hydrogenated isomaltulose and the hydrogenated dextrose; and
   (b) lyophilizing the resulting mixture into a stable solid form.

3. A process according to claim 1 for preparing a low calorie sweetener which is in solid form, said process comprising:
   (a) preparing a mixture comprising by weight:
      0.23% aspartame;
      30% hydrogenated isomaltulose;
      5% modified starch; and
      64.67% water
   by:
      (1) first dispersing the aspartame in the water with a mixing means which applies a shearing force sufficient to produce a dispersion of the aspartame in the water; and then
      (2) successively mixing into the dispersion of aspartame in water, the hydrogenated isomaltulose and the modified starch; and
   (b) lyophilizing the resulting mixture into a stable solid form.

4. A process according to claim 2 for preparing a low calorie sweetener which is in solid form, said process comprising:
   (a) preparing a mixture comprising by weight:
      1% aspartame;
      30% hydrogenated isomaltulose;
      1% modified starch;
      2% hydrogenated dextrose; and
      66% water
   by:
      (1) first dispersing the aspartame in the water with a mixing means which applies a shearing force sufficient to produce a dispersion of the aspartame in the water; and then
      (2) successively mixing into the dispersion of aspartame in water, the hydrogenated isomaltulose, the modified starch, and the hydrogenated dextrose; and
   (b) lyophilizing the resulting mixture into a stable solid form.

5. A process according to claim 1 for preparing a low calorie sweetener which is in solid form, said process comprising:
   (a) preparing a mixture comprising by weight:
      0.3% aspartame;
      15% hydrogenated isomaltulose;
      5% modified starch;
      15% of mannitol; and
      64.7% water
   by:
      (1) fist dispersing the aspartame in the water with a mixing means which applies a shearing force sufficient to produce a dispersion of the aspartame in the water; and then (2) successively mixing into the dispersion of aspartame in water, the hydrogenated isomaltulose, the modified starch, and the mannitol; and (b) lyophilizing the resulting mixture into a stable solid form.

6. A process according to claim 1 for preparing a low calorie sweetener which is in solid form, said process comprising:

(a) preparing a mixture comprising by weight:
1% aspartame;
15% hydrogenated isomaltulose;
5% modified starch;
15% of a mannitol; and
64% water by:

(1) first dispersing the aspartame in the water with a mixing means which applies a shearing force sufficient to produce a dispersion of the aspartame in the water; and then (2) successively mixing into the dispersion of aspartame in water, the hydrogenated isomaltulose, the modified starch, and the mannitol; and (b) lyophilizing the resulting mixture into a stable solid form.

7. A process according to claim 1 wherein the lyophilizing is carried out in containers having partitions defining cavities having substantially the dimensions of a lump of sugar.

8. A process according to claim 1 wherein said lyophilizing step is followed by the conversion of the lyophilized product into shaped lumps using a cutting means.

9. A process according to claim 1 wherein said water is cold.

10. A sweetener intended for foodstuffs which is produced by the process of claim 1.

11. A sweetener intended for foodstuffs which is produced by the process of claim 2.

12. A sweetener intended for foodstuffs which is produced by the process of claim 3.

13. A sweetener intended for foodstuffs which is produced by the process of claim 1.

14. A sweetener intended for foodstuffs which is produced by the process of claim 5.

15. A sweetener intended for foodstuffs which is produced by the process of claim 6.

16. A sweetener intended for foodstuffs which is produced by the process of claim 7.

17. A sweetener intended for foodstuffs which is produced by the process of claim 8.

* * * * *

UNITED STATES PATENT AND TRADEMARK OFFICE
CERTIFICATE OF CORRECTION

PATENT NO. : 5,242,705
DATED : September 7, 1993
INVENTOR(S) : Cailler, et al.

It is certified that error appears in the above-indentified patent and that said Letters Patent is hereby corrected as shown below:

Column 1, line 39, reading "higher alcohols" should read -- higher alcohols. --.

Column 2, line 13, reading "add polysaccharides" should read -- and polysaccharides --.

Column 3, line 4, reading "I%," should read -- 1%, --.

Column 3, line 6, reading "selected the" should read -- selected from the --.

Column 3, line 37, reading "-,16-glucitol" should read -- -1,6-glucitol --.

Column 3, line 42, reading "maltodextrin sorbitol" should read -- maltodextrin, sorbitol --.

Column 4, line 25, reading "step I" should read -- step 1 --.

Column 4, line 36, reading "is raise" should read -- is raised --.

UNITED STATES PATENT AND TRADEMARK OFFICE
CERTIFICATE OF CORRECTION

PATENT NO. : 5,242,705

DATED : September 7, 1993

INVENTOR(S) : Cailler, et al.

It is certified that error appears in the above-indentified patent and that said Letters Patent is hereby corrected as shown below:

Column 5, line 24, reading "by mean" should read -- by means --.

Column 5, line 55, reading "first dispersing" should read -- (1) first dispersing --.

Signed and Sealed this

Thirteenth Day of December, 1994

Attest:

BRUCE LEHMAN

Attesting Officer     Commissioner of Patents and Trademarks